(12) United States Patent
Marchais et al.

(10) Patent No.: US 11,962,180 B2
(45) Date of Patent: Apr. 16, 2024

(54) MULTI-OUTPUT MULTI-PHASE BOOST CONVERTER WITH DYNAMICALLY ASSIGNABLE PHASES

(71) Applicant: Cirrus Logic International Semiconductor Ltd., Edinburgh (GB)

(72) Inventors: Emmanuel Marchais, Dripping Springs, TX (US); Ross C. Morgan, Bathgate (GB); Ivan Perry, Penicuik (GB); Eric J. King, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 538 days.

(21) Appl. No.: 17/220,641

(22) Filed: Apr. 1, 2021

(65) Prior Publication Data

US 2022/0320999 A1 Oct. 6, 2022

(51) Int. Cl.
*H02J 7/00* (2006.01)
*H02M 1/00* (2006.01)
*H02M 3/04* (2006.01)

(52) U.S. Cl.
CPC .............. *H02J 7/007* (2013.01); *H02M 1/008* (2021.05); *H02J 2207/20* (2020.01); *H02M 3/04* (2013.01)

(58) Field of Classification Search
CPC .......... H02M 3/04; H02M 1/008; H02J 7/007; H02J 2207/20
USPC ................................ 320/140, 134, 138, 163
See application file for complete search history.

(56) References Cited

U.S. PATENT DOCUMENTS

| | | | |
|---|---|---|---|
| 2011/0084673 | A1 | 4/2011 | Chang et al. |
| 2017/0047742 | A1* | 2/2017 | Narla ...................... H02J 3/381 |
| 2018/0241255 | A1* | 8/2018 | Leabman ............. H04B 5/0075 |
| 2020/0091820 | A1* | 3/2020 | Ripley .................. H02M 3/158 |
| 2020/0112260 | A1* | 4/2020 | Suzuki ............. H02M 3/33561 |
| 2021/0028710 | A1* | 1/2021 | Cao .......................... H02J 7/34 |
| 2021/0328514 | A1* | 10/2021 | Schleicher ............ H02J 7/0013 |

FOREIGN PATENT DOCUMENTS

| | | |
|---|---|---|
| EP | 3454463 A1 | 3/2019 |
| WO | 2020047667 A1 | 3/2020 |

OTHER PUBLICATIONS

International Search Report and Written Opinion of the International Searching Authority, International Application No. PCT/US2022/019671, dated Jun. 14, 2022.

* cited by examiner

*Primary Examiner* — Edward Tso
*Assistant Examiner* — Aaron Piggush
(74) *Attorney, Agent, or Firm* — Jackson Walker L.L.P.

(57) ABSTRACT

A power delivery system may include an inductive power converter comprising a shared connection to a shared voltage from a battery, multiple inductive phases, each of the multiple inductive phases configured to generate a respective voltage from the shared voltage, multiple regulated voltage connections, and one or more switches configured and arranged to selectively assign at least one of the multiple inductive phases to a regulated voltage connection selected from the multiple regulated voltage connections.

24 Claims, 4 Drawing Sheets

MULTI-OUTPUT MULTI-PHASE BOOST CONVERTER WITH DYNAMICALLY ASSIGNABLE PHASES

FIELD OF DISCLOSURE

The present disclosure relates in general to circuits for electronic devices, including without limitation personal portable devices such as wireless telephones and media players, and more specifically, to a boost converter having multiple outputs and multiple phases wherein such phases are dynamically assignable to the outputs.

BACKGROUND

Portable electronic devices, including wireless telephones, such as mobile/cellular telephones, tablets, cordless telephones, mp3 players, smart watches, health monitors, and other consumer devices, are in widespread use. Such a portable electronic device may include circuitry for implementing a boost converter for converting a battery voltage (e.g., provided by a lithium-ion battery) into a supply voltage delivered to one or more components of the portable electronic device. The power delivery network may also regulate such supply voltage, and isolate the downstream loads of these one or more devices from fluctuation in an output voltage of the battery over the course of operation.

SUMMARY

In accordance with the teachings of the present disclosure, one or more disadvantages and problems associated with existing approaches to operating a boost converter may be reduced or eliminated.

In accordance with embodiments of the present disclosure, a power delivery system may include an inductive power converter comprising a shared connection to a shared voltage from a battery, multiple inductive phases, each of the multiple inductive phases configured to generate a respective voltage from the shared voltage, multiple regulated voltage connections, and one or more switches configured and arranged to selectively assign at least one of the multiple inductive phases to a regulated voltage connection selected from the multiple regulated voltage connections.

In accordance with embodiments of the present disclosure, a method may be used in a power delivery system having an inductive power converter including a shared connection to a shared voltage from a battery, multiple inductive phases wherein each of the multiple inductive phases are configured to generate a respective voltage from the shared voltage, and multiple regulated voltage connections. The method may include selectively assigning at least one of the multiple inductive phases to a regulated voltage connection selected from the multiple regulated voltage connections via one or more switches.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
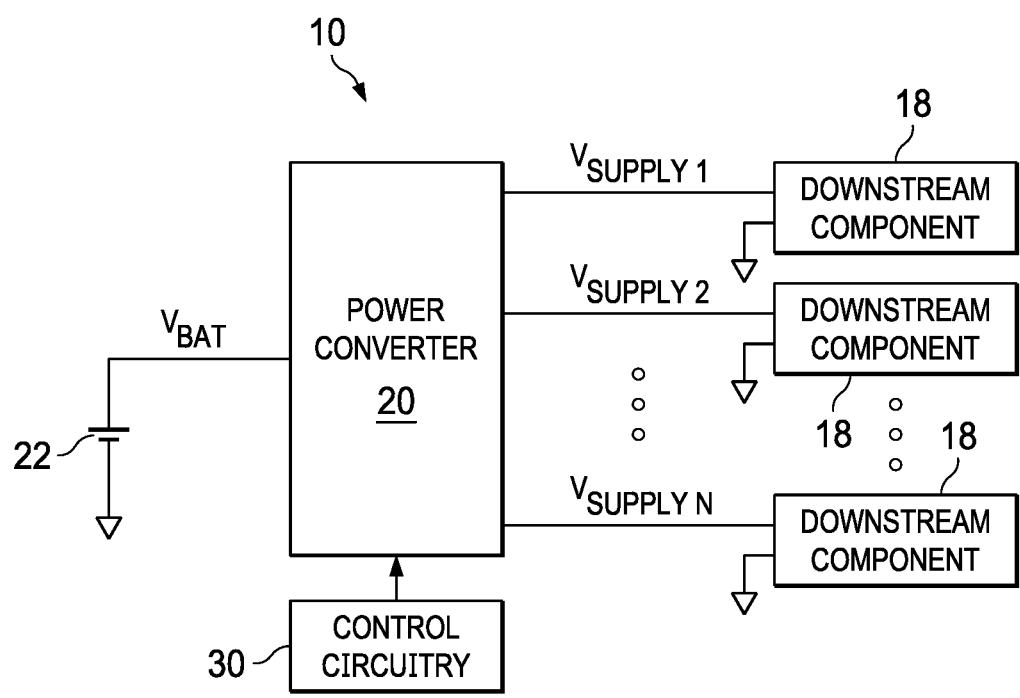
FIG. 1 illustrates a block diagram of selected components of a power delivery network, in accordance with embodiments of the present disclosure.

FIG. 1 illustrates a block diagram of selected components of a power delivery network 10, in accordance with embodiments of the present disclosure. In some embodiments, power delivery network 10 may be implemented within a portable electronic device, such as a smart phone, tablet, game controller, and/or other suitable device.

As shown in FIG. 1, power delivery network 10 may include a power converter 20 comprising a plurality of inductive phases, wherein each inductive phase may be configured to boost a battery voltage $V_{BAT}$ at the input at an input of power converter 20 to generate one or more supply voltages $V_{SUPPLY1}$, $V_{SUPPLY2}$, ... $V_{SUPPLYN}$ at the outputs of power converter 20, to a plurality of downstream components 18 of power delivery network 10. In addition, one or more of the plurality of inductive phases may each also be configured to buck one of supply voltages $V_{SUPPLY1}$, $V_{SUPPLY2}$, ... $V_{SUPPLYN}$ to generate battery voltage $V_{BAT}$ at the input of power converter 20. Downstream components 18 of power delivery network 10 may include any suitable functional circuits or devices of downstream components 18, including without limitation processors, audio coder/decoders, amplifiers, display devices, etc. In some embodiments, one of downstream components 18 may comprise a battery charger for recharging battery 22. In the case that one of downstream components 18 is a battery charger, power converter 20 may operate as a buck converter to buck a voltage generated by such battery charger to a lower battery voltage $V_{BAT}$.

As described in greater detail below with reference to FIGS. 2 and 3, power converter 20 may comprise a plurality of phases, wherein one or more of such phases may be dynamically assignable among two or more of the plurality of outputs of power converter 20 (including a scenario wherein multiple phases of power converter 20 may be assigned to a single output of power converter 20), based on requirements for the one or more supply voltages $V_{SUPPLY1}$, $V_{SUPPLY2}$, ... $V_{SUPPLYN}$, requirements of battery 22, and/or power requirements of individual downstream components 18.

In some embodiments of power delivery network 10, power converter 20 may comprise the only component of power delivery network 10 directly and electrically coupled to battery 22, and power converter 20 may electrically interface between battery 22 and all downstream components 18 of power delivery network 10. However, in other embodiments of power delivery network 10, some downstream components 18 may electrically couple directly to battery 22.

As shown in FIG. 1, power delivery network 10 may also include control circuitry 30 for controlling operation of power converter 20, including switching and commutation of switches internal to power converter 20 to regulate supply voltages $V_{SUPPLY1}$, $V_{SUPPLY2}$, ... $V_{SUPPLYN}$ and control dynamic assignment of phases of boost converter 20 to outputs of power converter 20.

Figure 2:
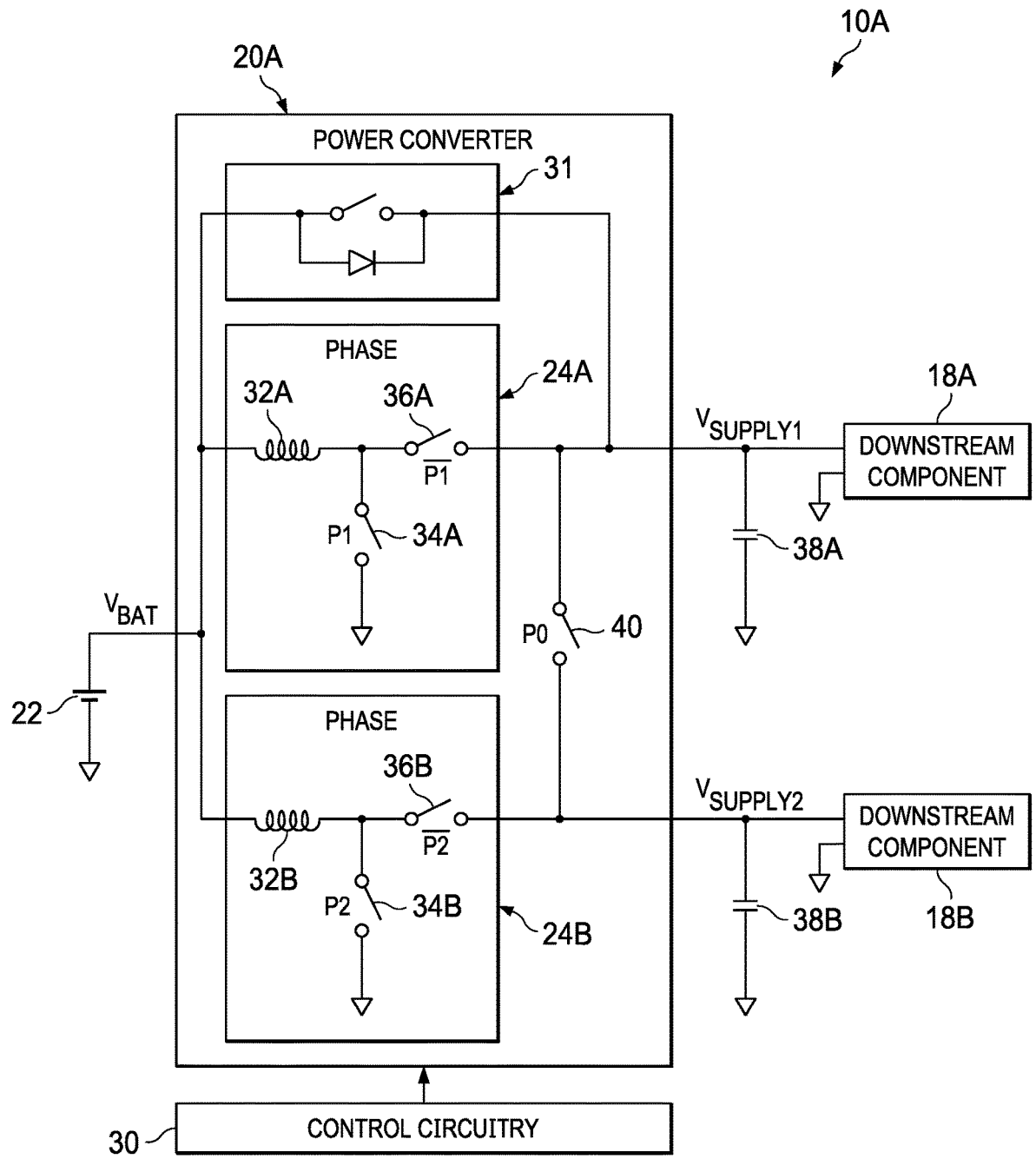
FIG. 2 illustrates a block diagram of selected components of a power delivery network with detail of selected components of a boost converter, in accordance with embodiments of the present disclosure.

FIG. 2 illustrates a block diagram of selected components of a power delivery network 10A with detail of selected components of a power converter 20A, in accordance with embodiments of the present disclosure. In some embodiments, power delivery network 10A may implement power delivery network 10 depicted in FIG. 1, and power converter 20A may implement power converter 20 depicted in FIG. 1. As shown in FIG. 2, power converter 20A may include a plurality of inductive phases 24 (e.g., phases 24A and 24B) and an output assignment switch 40. As shown in FIG. 2, each inductive phase 24 may include a bypass switch 31, a power inductor 32, a first switch 34, and a second switch 36.

In operation, control circuitry 30 may periodically commutate first switches 34 (e.g., during a charging state of an inductive phase 24) and second switches 36 (e.g., during a transfer state of an inductive phase 24) of an inductive phase 24 (as described in greater detail below) by generating appropriate control signals $P_1$, $\overline{P_1}$, $P_2$, and $\overline{P_2}$, to boost battery voltage $V_{BAT}$ to a higher supply voltage $V_{SUPPLY}$ (e.g., $V_{SUPPLY1}$ and $V_{SUPPLY2}$ at output capacitors 38A and 38B, respectively) in order to regulate such supply voltages $V_{SUPPLY}$ at a desired voltage level.

In addition, control circuitry 30 may also be configured to selectively activate (e.g., enable, close, turn on) or deactivate (e.g., disable, open, turn off) output assignment switch 40 in order to selectively couple (e.g., short) supply voltage $V_{SUPPLY1}$ to supply voltage $V_{SUPPLY2}$ or decouple (e.g., open) supply voltage $V_{SUPPLY1}$ from supply voltage $V_{SUPPLY2}$. For example, in scenarios in which downstream components 18A and 18B are both present and are to share a common supply voltage, control circuitry 30 may activate output assignment switch 40 in order to couple supply voltage $V_{SUPPLY1}$ to supply voltage $V_{SUPPLY2}$. As a further example, in scenarios in which downstream components 18A and 18B are both present, powered on, and require different supply voltages, control circuitry 30 may deactivate output assignment switch 40 in order to decouple supply voltage $V_{SUPPLY1}$ from supply voltage $V_{SUPPLY2}$. As another example, in scenarios in which downstream component 18A is powered down and downstream component 18B is powered on, control circuitry 30 may activate output assignment switch 40 in order to couple supply voltage $V_{SUPPLY1}$ to supply voltage $V_{SUPPLY2}$, enabling power converter 20 to operate as a multi-phase converter to provide a regulated voltage to downstream component 18B.

In a specific embodiment, downstream component 18A may comprise a high-impedance battery charger for charging battery 22 and downstream component 18B may comprise an audio circuit. When downstream component 18A is such a high-impedance battery charger, control circuitry 30 may deactivate output assignment switch 40 in order to decouple supply voltage $V_{SUPPLY1}$ from supply voltage $V_{SUPPLY2}$, thus allowing inductive phase 24A to act as a buck converter to charge battery 22 from downstream component 18A, while allowing inductive phase 24A to act as a boost converter to boost battery voltage $V_{BAT}$ to generate supply voltage $V_{SUPPLY2}$ at a desired regulated voltage level for downstream component 18B.

In the event that battery voltage $V_{BAT}$ is greater than a desired regulated voltage for supply voltage $V_{SUPPLY1}$, control circuitry 30 may activate (e.g., enable, close, turn on) bypass switch 31 and second switch 36A and deactivate (e.g., disable, open, turn off) first switch 34A. In such bypass mode, the resistances of second switch 36A, power inductor 32A, and bypass switch 31 may combine to minimize a total effective resistance of a path between battery 22 and supply voltage $V_{SUPPLY}$. Although only one bypass switch 31 is shown for inductive phase 24A, power converter 20A may include a similar bypass switch for inductive phase 24B in addition to or in lieu of bypass switch 31. Further, such bypass switch 31 is not shown in FIGS. 3 and 4 for purposes of clarity and exposition, but one or more of power converter 20B and power converter 20C may include one or more bypass switches identical or similar to bypass switch 31.

For purposes of clarity and exposition, FIG. 2 depicts power converter 20 having two inductive phases 24. However, embodiments of power converter 20 may have any suitable number of inductive phases 24. In some embodiments, power converter 20 may comprise three or more inductive phases 24. Also for purposes of clarity and exposition, FIG. 2 depicts power converter 20 having a single output assignment switch 40. However, in embodiments of power converter 20 having three or more inductive phases 24, power converter 20 may have multiple output assignment switches 40 configured in any suitable manner to provide an ability to selectively and dynamically couple the various inductive phases 24 to one another and/or selectively and dynamically decouple the various inductive phases 24 from one another to assign inductive phases 24 to outputs of power converter 20 based on requirements of power delivery network 10.

Figure 3:
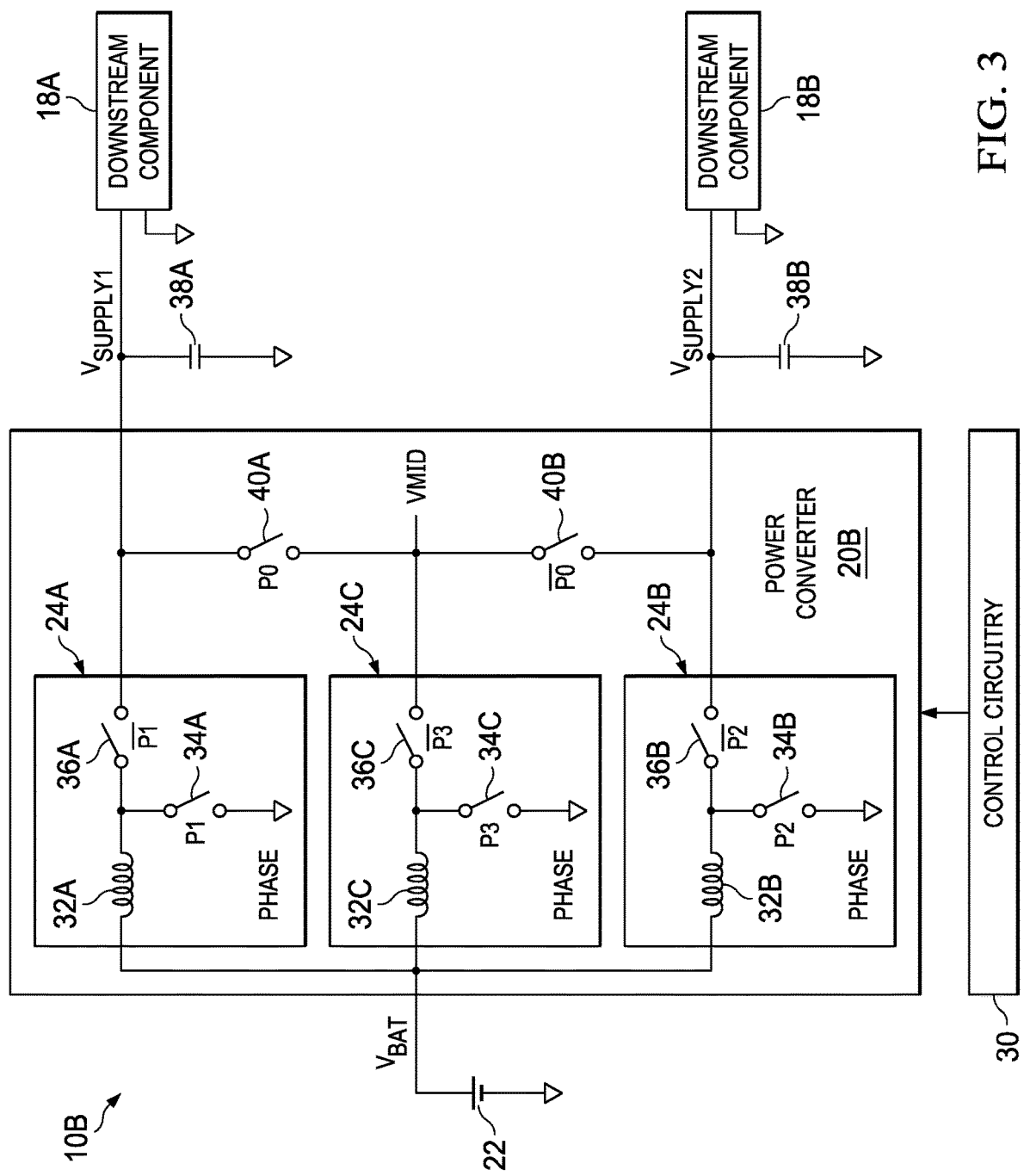
FIG. 3 illustrates a block diagram of selected components of another power delivery network with detail of selected components of a boost converter, in accordance with embodiments of the present disclosure.

For example, FIG. 3 illustrates a block diagram of selected components of a power delivery network 10B with detail of selected components of a power converter 20B, in accordance with embodiments of the present disclosure. In some embodiments, power delivery network 10B may implement power delivery network 10 depicted in FIG. 1, and power converter 20B may implement power converter 20 depicted in FIG. 1. Power delivery network 10B is similar in many respects to power delivery network 10A, and thus only selected differences of power delivery network 10B from power delivery network 10A may be discussed below. One difference is that power delivery network 10B may include an inductive phase 24C configured to generate a boosted output voltage $V_{MID}$ from battery voltage $V_{BAT}$. Another difference is that in lieu of output assignment switch 40, power delivery network 10B may include an output assignment switch 40A coupled between the outputs of inductive phase 24A and inductive phase 24C and an output assignment switch 40B coupled between the outputs of inductive phase 24B and inductive phase 24C. Accordingly, in a first mode, control circuitry 30 may activate output assignment switch 40A to couple supply voltage $V_{SUPPLY1}$ to voltage $V_{MID}$ and deactivate output assignment switch 40B to decouple supply voltage $V_{SUPPLY2}$ from voltage $V_{MID}$ such that inductive phases 24A and 24C are assigned to downstream component 18A and inductive phase 24B is assigned to downstream component 18B. Similarly, in a second mode, control circuitry 30 may activate output assignment switch 40B to couple supply voltage $V_{SUPPLY2}$ to voltage $V_{MID}$ and deactivate output assignment switch 40A to decouple supply voltage $V_{SUPPLY1}$ from voltage $V_{MID}$ such that inductive phases 24B and 24C are assigned to downstream component 18B and inductive phase 24A is assigned to downstream component 18A. Thus, if downstream component 18A has greater power requirements than downstream component 18B, control circuitry 30 may cause power converter 20B to operate in the first mode, and if downstream component 18B has greater power requirements than downstream component 18A, control circuitry 30 may cause power converter 20B to operate in the second mode.

Figure 4:
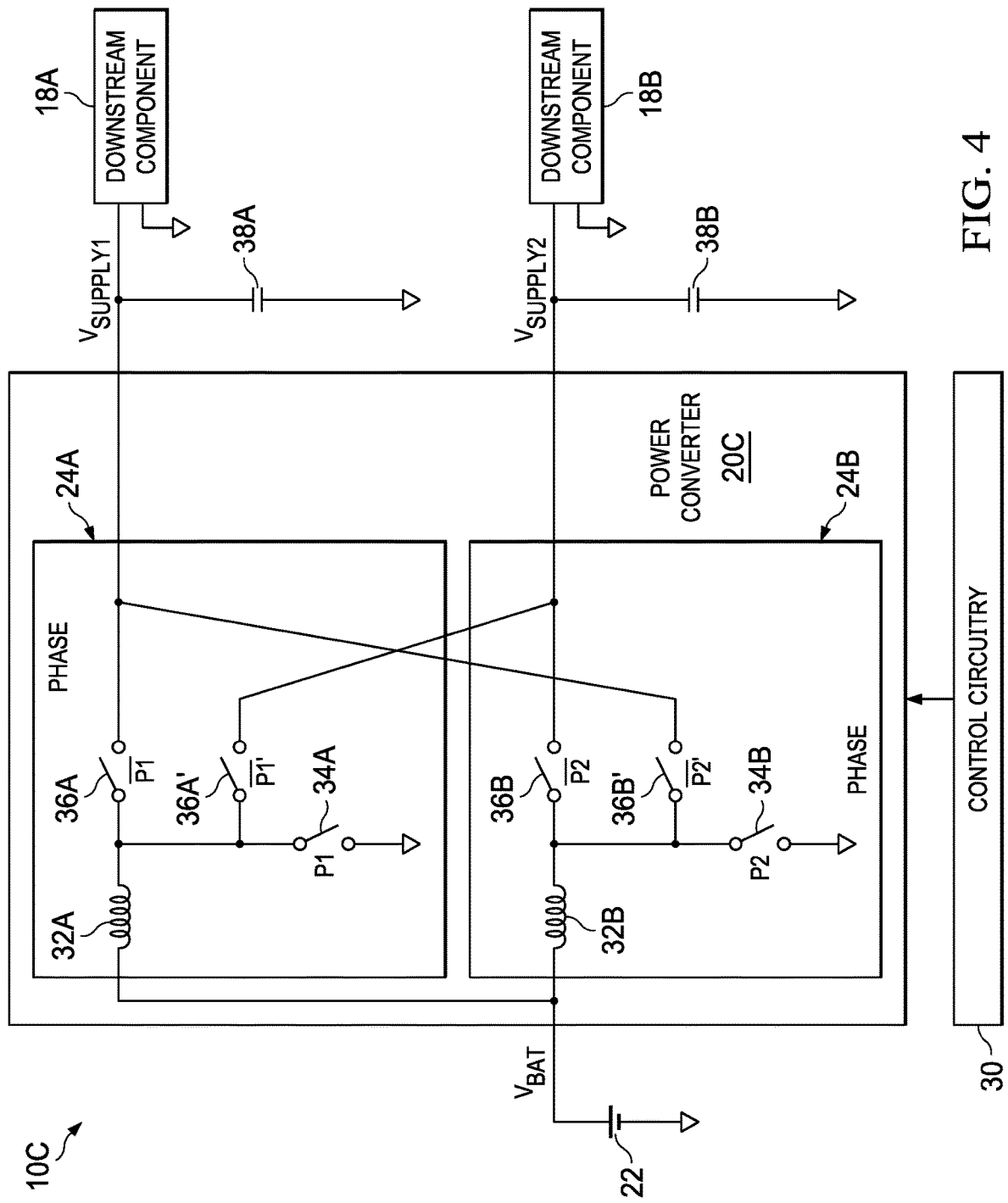
FIG. 4 illustrates a block diagram of selected components of yet another power delivery network with detail of selected components of a boost converter, in accordance with embodiments of the present disclosure.

FIG. 4 illustrates a block diagram of selected components of a power delivery network 10C with detail of selected components of a power converter 20C, in accordance with embodiments of the present disclosure. In some embodiments, power delivery network 10C may implement power delivery network 10 depicted in FIG. 1, and power converter 20C may implement power converter 20 depicted in FIG. 1. Power delivery network 10C is similar in many respects to power delivery network 10A, and thus only selected differences of power delivery network 10C from power delivery network 10A may be discussed below. One key difference between power delivery network 10C from power delivery network 10A is that in lieu of output assignment switch 40, power converter 20C may include crossover second switches 36' (e.g., second switches 36A' and 36B'). In order to assign inductive phase 24A to downstream component 18B in addition to downstream component 18A, control circuitry 30 may periodically commutate first switches 34A (e.g., during a charging state of an inductive phase 24A) and second switches 36A and 36A' (e.g., during a transfer state of inductive phase 24A) (as described in greater detail below) by generating appropriate control signals $P_1$, $\overline{P_1}$, and $\overline{P_1}'$. Similarly, in order to assign inductive phase 24B to downstream component 18A in addition to downstream component 18B, control circuit 30 may periodically commutate first switches 34B (e.g., during a charging state of an inductive phase 24B) and second switches 36B and 36B' (e.g., during a transfer state of inductive phase 24B) (as described in greater detail below) by generating appropriate control signals $P_2$, $\overline{P_2}$, and $\overline{P_2}'$.

For purposes of clarity and exposition, FIG. 4 depicts power converter 20 having two inductive phases 24. However, embodiments of power converter 20 may have any suitable number of inductive phases 24. In some embodiments, power converter 20 may comprise three or more inductive phases 24. In embodiments of power converter 20 having three or more inductive phases 24, power converter 20 may have any appropriate number and arrangement of crossover second switches 36' to allow dynamic assignment of inductive phases 24 to outputs of power converter 20.

In some embodiments, control circuitry 30 may apply assignment rules to prioritize certain downstream components 18 and/or to maximize efficiency of power converter 20. For example, one assignment rule may provide that if two or more downstream components 18 are simultaneously active with different voltage requirements and the total requested power of the downstream components 18 is higher than battery 22 is capable of providing, then control circuitry 30 may deem one downstream component 18 to be of lower priority and may shed some power delivery and one or more phases 24 from such lower-priority downstream component 18 to free phases 24 to assign to the higher-priority downstream component 18. As another example, another assignment rule may provide that a number of phases 24 assigned to a downstream component 18 may be determined by the best converter efficiency that may be achieved while meeting power requirements of the downstream component 18. As a further example, a further assignment rule may provide that if multiple downstream components 18 request more phases 24 than are available, any assignment of phases by power efficiency may take lower priority in order to meet power demand of the downstream components 18.

The systems and methods described herein may be advantageous to systems and methods which provide independent boost converters for each downstream component in a power delivery network. Such advantage may be realized because total system power of the power delivery network may be set by a power source (e.g., battery) and not the downstream components, hence an amount of inductance needed to provide boosted voltages may be set by the power source. On the other hand, if each downstream component included its own independent boost converter, inductances would need to be scaled to properly handle the sum of worst-case loading of the downstream components.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A power delivery system, comprising:
   an inductive power converter comprising:
      a shared connection to a shared voltage from a battery;
      multiple inductive phases, each of the multiple inductive phases configured to generate a respective voltage from the shared voltage;
      multiple regulated voltage connections; and
      one or more switches configured and arranged to selectively assign at least one of the multiple inductive phases to a regulated voltage connection selected from the multiple regulated voltage connections; and
   a control circuit communicatively coupled to the one or more switches and configured to:
      generate one or more control signals to the inductive converter to cause the one or more switches to selectively assign the at least one of the multiple inductive phases to the regulated voltage connection selected from the multiple regulated voltage connections; and
      apply one or more assignment rules to prioritize downstream components electrically coupled to the multiple regulated voltage connections and maximize an efficiency of the inductive power converter, wherein the one or more assignment rules include an assignment rule that provides that if two or more downstream components are simultaneously active with different voltage requirements and the total requested power of the downstream components is higher than the battery is capable of providing, the control circuit deems a first downstream component to be of lower priority than a second downstream component and prioritizes assignment of one or more of the multiple inductive phases to the second downstream component.

2. The power delivery system of claim 1, wherein the control circuit is configured to generate the one or more control signals based on a presence or absence of downstream components electrically coupled to the multiple regulated voltage connections.

3. The power delivery system of claim 1, wherein the control circuit is configured to generate the one or more control signals based on electrical requirements of downstream components electrically coupled to the multiple regulated voltage connections.

4. The power delivery system of claim 3, wherein the electrical requirements comprise voltage requirements of downstream components electrically coupled to the multiple regulated voltage connections.

5. The power delivery system of claim 3, wherein the electrical requirements comprise power requirements of downstream components electrically coupled to the multiple regulated voltage connections.

6. The power delivery system of claim 1, wherein the control circuit is configured to generate the one or more control signals based on requirements of the battery.

7. The power delivery system of claim 1, wherein each of the multiple inductive phases is configured to generate a respective boosted output voltage from the shared voltage.

8. The power delivery system of claim 1, wherein:
   one of the multiple regulated voltage connections is configured to couple to a battery charger; and
   when the battery charger is coupled to the one of the multiple regulated voltage connections, at least one of the multiple inductive phases operates as a buck converter to charge the battery from the battery charger.

9. The power delivery system of claim 1, wherein at least one of the multiple inductive phases is configured to generate the shared voltage from a respective voltage at a regulated voltage connection electrically coupled to the at least one of the multiple inductive phases.

10. The power delivery system of claim 1, wherein at least one of the multiple inductive phases comprises a bypass switch configured to bypass the shared voltage to the respective voltage of the at least one of the multiple inductive phases.

11. A power delivery system comprising:
    an inductive power converter comprising:
       a shared connection to a shared voltage from a battery;
       multiple inductive phases, each of the multiple inductive phases configured to generate a respective voltage from the shared voltage;
       multiple regulated voltage connections; and
       one or more switches configured and arranged to selectively assign at least one of the multiple inductive phases to a regulated voltage connection selected from the multiple regulated voltage connections; and
    a control circuit communicatively coupled to the one or more switches and configured to:
       generate one or more control signals to the inductive converter to cause the one or more switches to selectively assign the at least one of the multiple inductive phases to the regulated voltage connection selected from the multiple regulated voltage connections; and
       apply one or more assignment rules to prioritize downstream components electrically coupled to the multiple regulated voltage connections and maximize an efficiency of the inductive power converter, wherein the one or more assignment rules include a first assignment rule that provides that a number of the multiple inductive phases assigned to a downstream component is determined by a maximum converter efficiency achievable by the inductive power converter while meeting power requirements of the downstream component.

12. The power delivery system of claim 11, wherein the one or more assignment rules include a second assignment rule that provides that if multiple downstream components request more inductive phases than are available, then assignment of phases by power efficiency in accordance with the first assignment rule takes lower priority in order to meet power demand of the downstream components.

13. A method comprising, in a power delivery system having an inductive power converter including a shared connection to a shared voltage from a battery, multiple inductive phases wherein each of the multiple inductive phases are configured to generate a respective voltage from the shared voltage, and multiple regulated voltage connections:

via one or more switches, selectively assigning at least one of the multiple inductive phases to a regulated voltage connection selected from the multiple regulated voltage connections;

generating one or more control signals to the inductive converter to cause the one or more switches to selectively assign the at least one of the multiple inductive phases to the regulated voltage connection selected from the multiple regulated voltage connections; and applying one or more assignment rules to prioritize downstream components electrically coupled to the multiple regulated voltage connections and maximize an efficiency of the inductive power converter, wherein the one or more assignment rules include an assignment rule that provides that if two or more downstream components are simultaneously active with different voltage requirements and the total requested power of the downstream components is higher than the battery is capable of providing, a first downstream component is deemed to be of lower priority than a second downstream component and assignment of one or more of the multiple inductive phases is prioritized to the second downstream component.

14. The method of claim 13, further comprising generating the one or more control signals based on a presence or absence of downstream components electrically coupled to the multiple regulated voltage connections.

15. The method of claim 13, further comprising generating the one or more control signals based on electrical requirements of downstream components electrically coupled to the multiple regulated voltage connections.

16. The method of claim 15, wherein the electrical requirements comprise voltage requirements of downstream components electrically coupled to the multiple regulated voltage connections.

17. The method of claim 15, wherein the electrical requirements comprise power requirements of downstream components electrically coupled to the multiple regulated voltage connections.

18. The method of claim 13, further comprising generating the one or more control signals based on requirements of the battery.

19. The method of claim 13, wherein each of the multiple inductive phases is configured to generate a respective boosted output voltage from the shared voltage.

20. The method of claim 13, wherein:
one of the multiple regulated voltage connections is configured to couple to a battery charger; and
when the battery charger is coupled to the one of the multiple regulated voltage connections, at least one of the multiple inductive phases operates as a buck converter to charge the battery from the battery charger.

21. The method of claim 13, wherein at least one of the multiple inductive phases is configured to generate the shared voltage from a respective voltage at a regulated voltage connection electrically coupled to the at least one of the multiple inductive phases.

22. The method of claim 13, wherein at least one of the multiple inductive phases comprises a bypass switch configured to bypass the shared voltage to the respective voltage of the at least one of the multiple inductive phases.

23. A method comprising, in a power delivery system having an inductive power converter including a shared connection to a shared voltage from a battery, multiple inductive phases wherein each of the multiple inductive phases are configured to generate a respective voltage from the shared voltage, and multiple regulated voltage connections:

via one or more switches, selectively assigning at least one of the multiple inductive phases to a regulated voltage connection selected from the multiple regulated voltage connections;

generating one or more control signals to the inductive converter to cause the one or more switches to selectively assign the at least one of the multiple inductive phases to the regulated voltage connection selected from the multiple regulated voltage connections; and applying one or more assignment rules to prioritize downstream components electrically coupled to the multiple regulated voltage connections and maximize an efficiency of the inductive power converter, wherein the one or more assignment rules include a first assignment rule that provides that a number of the multiple inductive phases assigned to a downstream component are determined by a maximum converter efficiency achievable by the inductive power converter while meeting power requirements of the downstream component.

24. The method of claim 23, wherein the one or more assignment rules include a second assignment rule that provides that if multiple downstream components request more inductive phases than are available, then assignment of phases by power efficiency in accordance with the first assignment rule takes lower priority in order to meet power demand of the downstream components.

* * * * *